United States Patent [19]
van Bezooijen

[11] Patent Number: 5,745,869
[45] Date of Patent: Apr. 28, 1998

[54] TECHNIQUES FOR OPTIMIZING AN AUTONOMOUS STAR TRACKER

[75] Inventor: Roelof W.H. van Bezooijen, El Granada, Calif.

[73] Assignee: Lockheed Missiles & Space Company, Inc., Sunnyvale, Calif.

[21] Appl. No.: 867,603

[22] Filed: Jun. 2, 1997

Related U.S. Application Data

[63] Continuation of Ser. No. 534,378, Sep. 28, 1995, abandoned.

[51] Int. Cl.$^6$ .................................................. G05D 1/00
[52] U.S. Cl. .................................................... 701/222
[58] Field of Search .............................. 701/222, 226; 244/171; 250/203.6

[56] References Cited

U.S. PATENT DOCUMENTS

| | | | |
|---|---|---|---|
| 4,521,855 | 6/1985 | Lehner et al. | 364/434 |
| 4,617,634 | 10/1986 | Izumida et al. | 364/455 |
| 4,658,361 | 4/1987 | Kosaka et al. | 364/434 |
| 4,658,431 | 4/1987 | Yokota | 382/53 |
| 4,674,715 | 6/1987 | Frisch | 244/171 |
| 4,688,092 | 8/1987 | Kamel et al. | 358/109 |
| 4,740,680 | 4/1988 | Frisch | 250/203 R |
| 5,012,081 | 4/1991 | Jungwirth et al. | 250/203.6 |
| 5,109,346 | 4/1992 | Wertz | 364/459 |
| 5,189,295 | 2/1993 | Falbel | 250/206.2 |
| 5,223,702 | 6/1993 | Conley | 250/203.6 |
| 5,259,577 | 11/1993 | Achkar et al. | 244/164 |
| 5,348,255 | 9/1994 | Abreu | 244/171 |
| 5,412,574 | 5/1995 | Bender et al. | 364/455 |
| 5,473,746 | 12/1995 | Pritt et al. | 395/161 |
| 5,485,383 | 1/1996 | Schreiber | 364/434 |
| 5,500,521 | 3/1996 | Suzuki | 250/208.1 |
| 5,506,780 | 4/1996 | Montenbruck et al. | 364/459 |
| 5,525,793 | 6/1996 | Holmes et al. | 250/203.6 |
| 5,546,309 | 8/1996 | Johnson et al. | 364/434 |

FOREIGN PATENT DOCUMENTS

WO 95/03215   2/1995   WIPO.

OTHER PUBLICATIONS

Liebe, "Star Trackers for Attitude Determination", IEEE Aerospace and Electronics Systems magazine, vol. 10, No. 6, Jun. 1995, pp. 10–16.

R.W.H. van Bezooijen "Automated Star Pattern Recognition For Use With The Space Infrared Telescope Facility (SIRTF)," *10th IFAC Symposium*, Jun. 25–28, 1985, Toulouse, France, pp. 59–67.

R.W.H. van Bezooijen, "Success Potential of Automated Star Pattern Recognition," *AIAA 24th Aerospace Sciences Meeting*, Jan. 6–9, 1986, Reno, Nevada, U.S.A., paper AIAA-86-0254.

R.W.H. van Bezooijen, "Automated Star Pattern Recognition," *Stanford University Ph.D. dissertation*, Jun., 1989.

(List continued on next page.)

*Primary Examiner*—Michael Zanelli
*Attorney, Agent, or Firm*—Fenwick & West LLP

[57] ABSTRACT

A method for determining the attitude of a spacecraft (1) by observing stars (2) within a starfield (3). A detector (13), camera electronics (14), and computer (15) located on board the spacecraft (1) are used to generate a set of star match groups by matching pairs of stars observed by the detector (13) with pairs of guide stars from a stored database (18) of guide stars. Match groups having small numbers of stars are eliminated. Non-eliminated match groups are validated. Redundant match groups are eliminated. A match group having the largest number of stars is selected. Finally, the attitude of the spacecraft (1) is derived from positions of guide stars within the selected match group. The guide star database (18) can be broken into an acquisition guide star database (8) and a supplementary guide star database (9). The field of view (20) of detector (13) can be broken into a grid of pixels overlaid by a grid of superpixels (21). The guide star pairs are preferably presorted in order of increasing angular separation. An identification matrix (IDGRP) can be used to speed the star identification process.

9 Claims, 4 Drawing Sheets

OTHER PUBLICATIONS

R.W.H. van Bezooijen, "Autonomous Star Tracker Development," *12th IFAC Symposium on Automatic Control in Aerospace—Aerospace Control '92*, Sep. 7–11, 1992, Ottobrunn, Germany, pp. 563–568.

R.W.H. van Bezooijen, "Star Sensors for Autonomous Attitude Control and Navigation," *SPIE OE/Technology '92 Symposium*, Nov. 17,1992, Boston, Massachusetts, U.S.A., pp. 1–28.

R.W.H. van Bezooijen, "True-sky demonstration of an autonomous star tracker," *SPIE International Symposium on Optical Engineering in Aerospace Sensing*, Apr. 5, 1994, Orlando Florida , pp. 1–13.

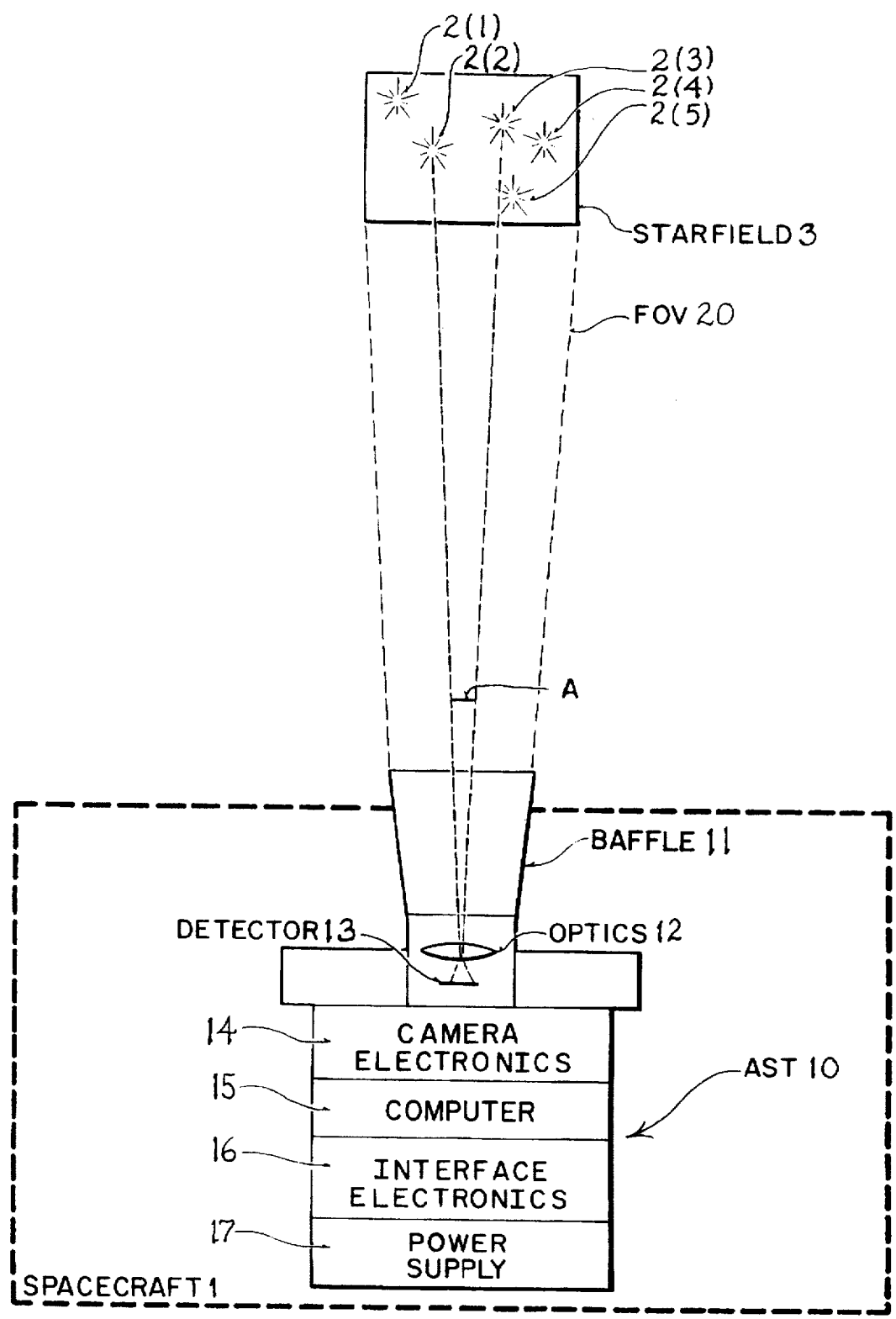

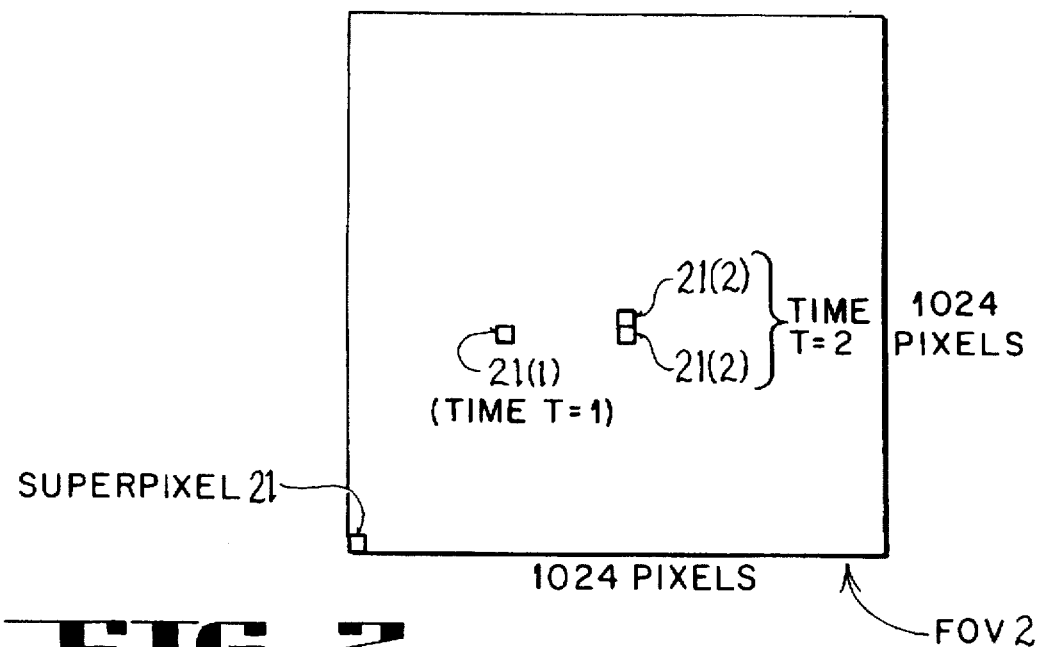
FIG_2
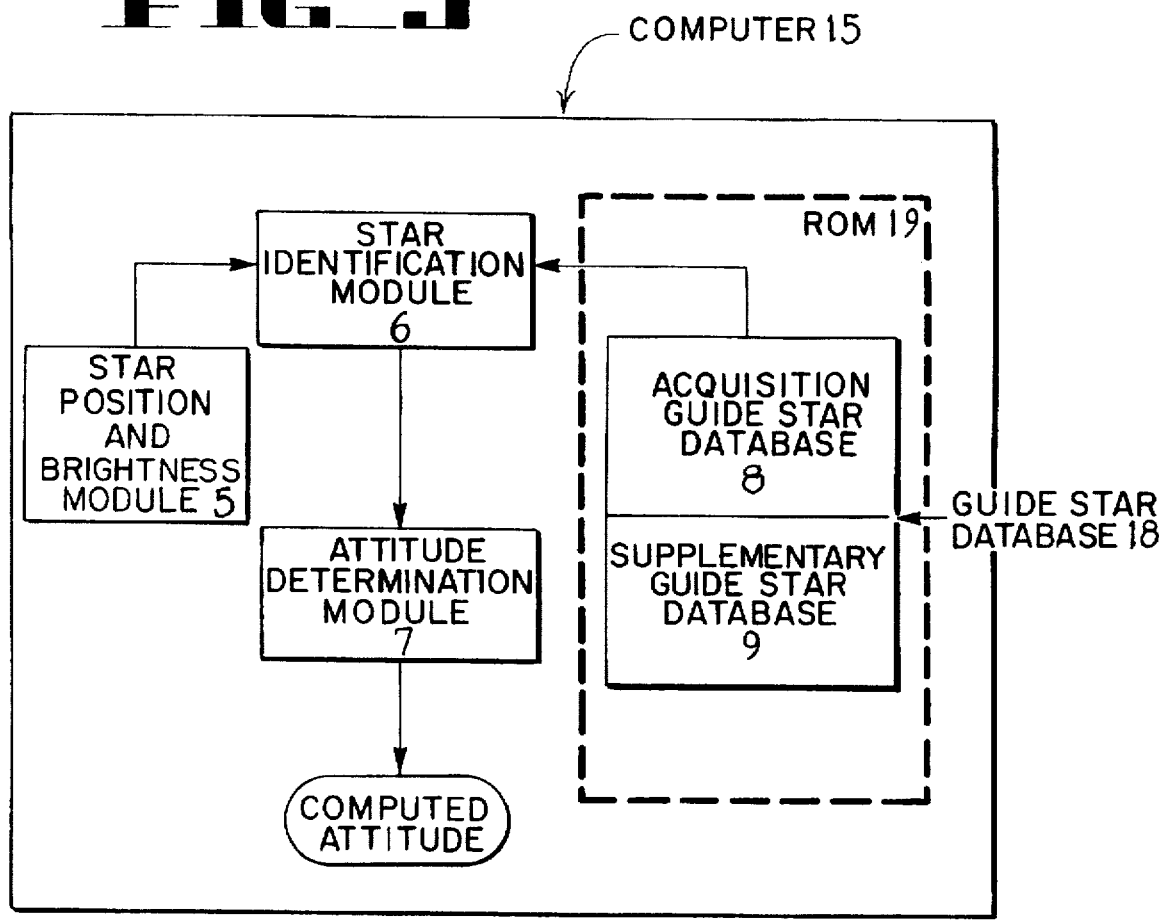
FIG_5

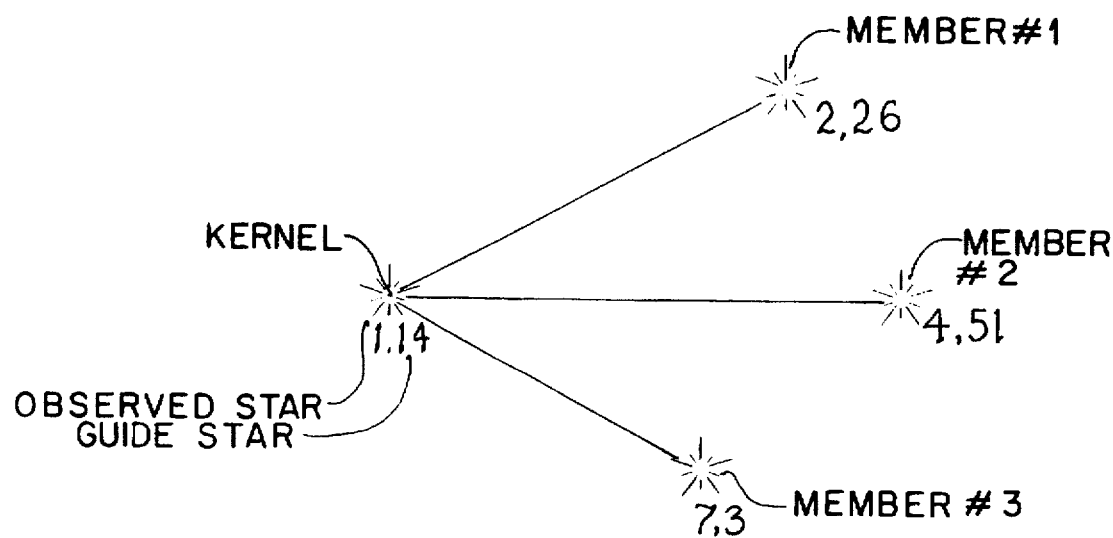
FIG_3
FIG_4
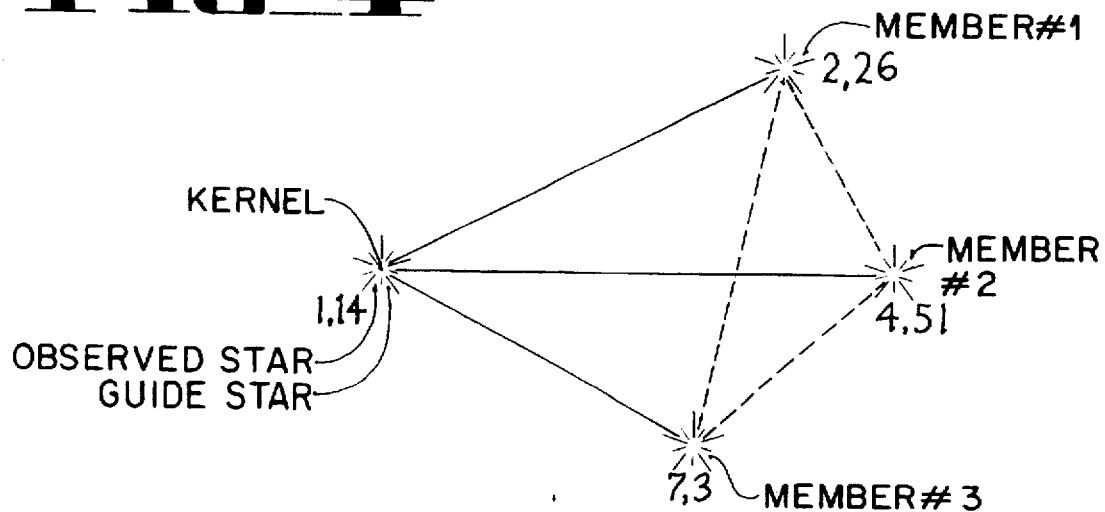

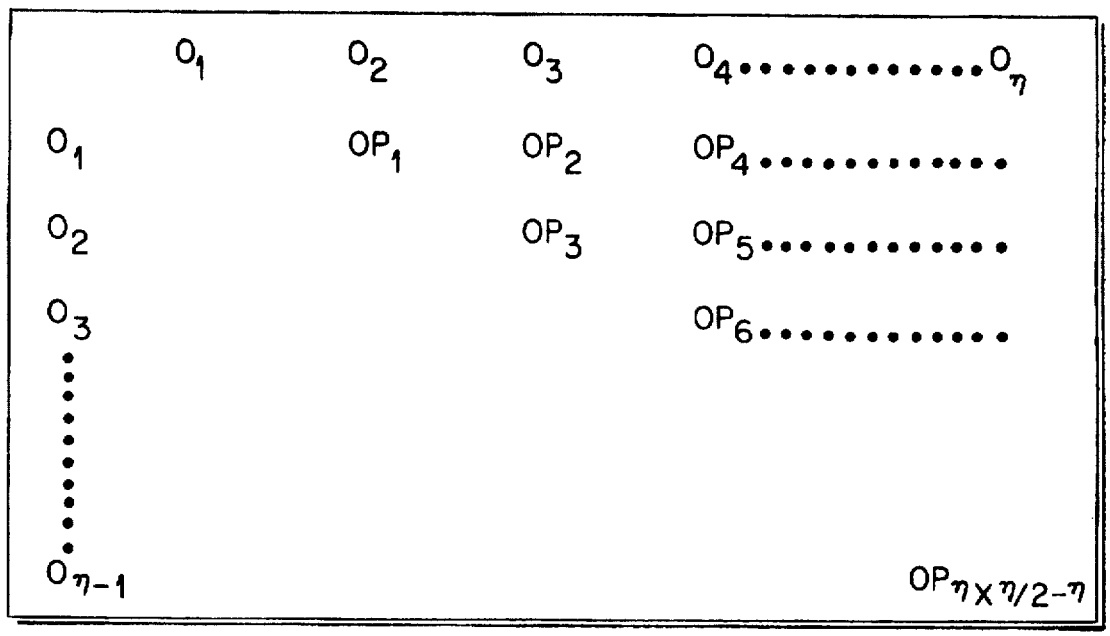
FIG_6
FIG_7
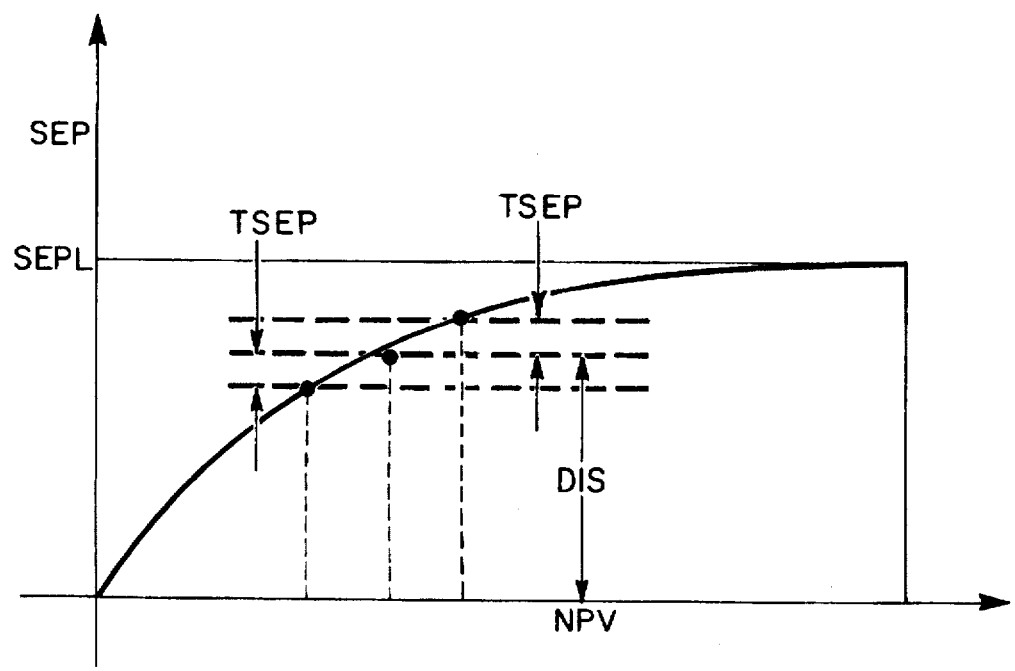

TECHNIQUES FOR OPTIMIZING AN AUTONOMOUS STAR TRACKER

RELATED APPLICATIONS

This is a continuation of U.S. patent application Ser. No. 08/534,378 filed on Sep. 28, 1995 now abandoned.

DESCRIPTION

1. Technical Field

This invention pertains to the field of determining the attitude of a spacecraft by means of sensing stars.

2. Background Art

Attitude determination of spacecraft using star tracking has been discussed in the following publications:

R. W. H. van Bezooijen, et al., "Automated Star Pattern Recognition for Use with the Space Infrared Telescope Facility (SIRTF)," 10th IFAC Symposium, 25–28 Jun. 1985, Toulouse, France, pp. 59–67.

R. W. H. van Bezooijen, "Success Potential of Automated Star Pattern Recognition," AIAA 24th Aerospace Sciences Meeting, Jan. 6–9, 1986, Reno, Nev., U.S.A., paper AIAA-86-0254.

R. W. H. van Bezooijen, "Automated Star Pattern Recognition," Stanford University Ph.D. dissertation, June, 1989.

R. W. H. van Bezooijen, "Autonomous Star Tracker Development," 12th IFAC Symposium on Automatic Control in Aerospace—Aerospace Control '92, Sep. 7–11, 1992, Ottobrunn, Germany, pp. 563–568.

R. W. H. van Bezooijen, "Star Sensors for Autonomous Attitude Control and Navigation," SPIE OE/Technolovy '92 Symposium, Nov. 17, 1992, Boston, Mass., U.S.A., pp. 1–28.

R. W. H. van Bezooijen, "True-sky Demonstration of an Autonomous Star Tracker," SPIE's International Symposium on Optical Engineering in Aerospace Sensing, Apr. 5, 1994, Orlando, Fla., U.S.A., pp. 1–13.

The above publications, all authored by the sole inventor of the present patent application, are hereby incorporated by reference in the present patent application.

Disclosure of Invention

The present invention is a method for determining the attitude of a spacecraft (1) by observing stars (2) within a starfield (3). A detector (13), camera electronics (14), and computer (15) located on board the spacecraft (1) are used to generate a set of star match groups by matching pairs of stars observed by the detector (13) with pairs of guide stars from a stored database (18) of guide stars. Match groups having small numbers of stars are eliminated. Non-eliminated match groups are validated. Redundant match groups are eliminated. A match group having the largest number of stars is selected. Finally, the attitude of the spacecraft (1) is derived from positions of guide stars within the selected match group.

BRIEF DESCRIPTION OF THE DRAWINGS

These and other more detailed and specific objects and features of the present invention are more fully disclosed in the following specification, reference being had to the accompanying drawings, in which:

FIG. 1 is a block sketch of an autonomous star tracker 10 that can be used in conjunction with the present invention.

FIG. 2 is a sketch of an exemplary field of view 20 encompassed by detector 13, showing a grid of pixels and a grid of superpixels 21 imposed thereon.

FIG. 3 is a schematic diagram of a match group that is generated by the present invention.

FIG. 4 is a schematic diagram of the match group depicted in FIG. 3 showing validation of the match group.

FIG. 5 is a block diagram showing modules located within computer 15.

FIG. 6 is a matrix showing a preferred ranking of observed star pairs.

FIG. 7 is a graph showing the quadratic relationship between the number of the guide star pair (NPV) and the angular separation between members of the guide star pair (SEP).

DETAILED DESCRIPTION OF THE PREFERRED EMBODIMENTS

The present invention is used for determining the attitude of a spacecraft 1 by means of sensing stars 2. It can be embodied in an autonomous star tracker, such as the Autonomous Star Tracker (AST) 10 being developed by Lockheed Palo Alto Research Laboratory in anticipation of the need for smart sensors capable of supporting autonomous, long-duration, space flight missions. AST 10 (see FIG. 1) is a low-cost, highly accurate miniature device flown on board spacecraft 1. Its input is starfield 3, and its output is its attitude and hence the attitude of spacecraft 1 on which it is mounted. AST 10 is capable of determining its attitude in a fraction of a second without requiring any a priori attitude knowledge. In addition to this attitude acquisition capability, AST 10 can perform attitude updates autonomously and is able to provide its attitude at a 10 Hz rate while tracking starfield 3.

As shown in FIG. 1, baffle 11 serves as a sun/earth/moon shade. Optics 12 (which can be refractive, reflective, or some combination thereof) focuses light from starfield 3 onto a detector 13, preferably a frame-transfer CCD (charge coupled device). Detector 13 can be any type of sensor that measures intensity and position of objects in field of view 20, including an ICD or an active pixel sensor (APS). Detector 13 measures the intensities of the observed stars 2, at pixel locations therewithin. Field of view (FOV) 20 is determined by the focal length of optics 12 and the dimensions of the sense area of detector 13.

Camera electronics 14, preferably implemented with application specific integrated circuits (ASICs), is coupled to detector 13, and converts light intensity signals from detector 13 into a form usable by computer 15. Computer 15 is preferably a compact single-board computer with a radiation hard 32-bit RISC processor, having dual 1553B and dual RS 422 interfaces. Computer 15 comprises a central processing unit (CPU), random access memory (RAM), and read only memory (ROM) 19. Within the ROM 19 is guide star database 18, an all sky guide star database (see FIG. 5). Star identification is performed by a memory-efficient and highly robust method that is typically implemented in a software or firmware module 6 within computer 15. The method finds the largest groups of observed stars (from module 5) matching a group of guide stars (from database 18). Attitude determination module 7 is then invoked to convert the position of the matched stars into the attitude of AST 10.

The sensitivity of AST 10 permits it to operate at all sky locations. It can tolerate bright objects in its field of view 20

(such as those due to the planet Jupiter and space debris), because of the geometrical and brightness constraints imposed by the star identification method. AST 10 is designed to survive sun pointing without the use of a shutter.

Functions enabled or enhanced by AST 10 include: rapid attitude acquisition; fast fault recovery; autonomous updating of gyro-based attitude control and navigation systems; gyroless or low-cost gyro spacecraft 1 attitude control; autonomous acquisition of celestial targets by orbiting, suborbital, airborne, or ground-based astronomy telescopes; precision pointing to terrestrial targets from space (GPS assisted); autonomous optical navigation of planetary spacecraft 1; and autonomous position acquisition (longitude and latitude) of planetary rovers using a zenith-pointed AST 10. Besides providing the functionality needed for future advanced attitude control and navigation systems, AST 10 also improves spacecraft 1 reliability; and lowers mass, power, cost, and operating expenses.

AST 10 can be used on any type of spacecraft 1, whether three-axis stabilized or spin stabilized.

In an experiment that was performed, the attitude acquisition capability of AST 10 was demonstrated through correct and rapid (less than one second) identification of all 704 true-sky starfields 3 observed at the Lick Observatory in California. The AST 10 used in that experiment was equipped with a 512×1024 pixel frame-transfer CCD 13 and a 50 mm f/1.2 lens 12 that provided an effective 6.5 degree by 13.2 degree field of view 20. The overlapping fields 20 covered 47 percent of the sky, including areas both rich and sparse with stars 2.

Guide star database 18 is typically derived from the SKYMAP star catalog. This catalog was compiled primarily for the purpose of satellite attitude determination, and provides 622 bytes of information for each of the 248,563 stars cataloged therein. Guide star database 18 can be broken up into acquisition guide star database 8, typically containing relatively bright stars, and supplementary (auxiliary) guide star database 9, typically containing relatively less bright stars (FIG. 5). Acquisition guide star database 8 preferably includes data concerning pairs of acquisition guide stars.

In a preferred embodiment, CCD 13 has 1024×1024 imaging pixels. The version of AST 10 using this CCD 13 has a field of view 20 of 10.3 degrees×10.3 degrees, a sensitivity of 7.3 $m_v$, and the capability of tracking up to at least 50 stars 2. This provides an overall pitch and yaw attitude accuracy of better than 1.0 arcsec (at 1 standard deviation), an overall roll attitude accuracy of 14 arcsec, and a per star per axis attitude accuracy of 4 arcsec at the magnitude limit. The tracking rate at full performance is 0.3 deg/sec. The tracking rate at reduced performance is better than 1 deg/sec. The track mode update rate is 10 Hz. The communications interface is 1553B/1773/custom. The average operating power is 4 watts at temperatures below 0° and increases to 7 watts at 50° C. The mass of AST 10, not including baffle 11, is only 1.5 kg. The operating temperature range is between −30° C. and +50° C. The number of guide stars in acquisition database 8 is approximately 4,400. The number of guide stars in supplementary database 9 is approximately 8,800. This embodiment of AST 10 is capable of performing attitude acquisition at all sky locations in less than one second with spacecraft 1 body rates up to one deg/sec.

On average, there are a total of 34 guide stars and auxiliary guide stars within field of view 20. True sky demonstrations show the availability of at least 13 trackable stars 2, even in sparse regions of the sky.

Conventional attitude acquisition methods are complex, time consuming processes, where typically a combination of the sun, the earth and the earth's magnetic field is employed to obtain an initial coarse attitude fix. Next a star sensor, sometimes in combination with a fine sun sensor, is used to determine the attitude accurately. By contrast, AST 10, operating in its acquisition mode, can perform accurate attitude acquisition in a fraction of a second, following stabilization of spacecraft 1.

The Assured Crew Return Vehicle (ACRV) is an example of a spacecraft 1 that would benefit from AST 10. Following separation from the Space Station, the ACRV must be placed in the correct attitude to perform a collision avoidance burn. This maneuver needs to be carried out within 15 minutes, which is hard to accomplish with conventional attitude acquisition methods that rely on use of the earth's magnetic field. The latter method is time consuming, because the magnetic field vector needs to rotate over an angle sufficiently large to allow adequate 3-axis attitude determination.

Operating in its acquisition mode, AST 10 enables fast recovery from faults that result in a loss of attitude knowledge. This capability is important for spacecraft 1, where outages either are unacceptable, are very costly, or would result in catastrophe if not remedied quickly. JPL's Cassini mission to Saturn is just one example of a project where AST 10 could be used to avert catastrophe.

For Cassini, the quick fault recovery enabled by AST 10 would reduce the length of the critical sequences associated with Saturn orbit insertion, Titan Probe release, and the Titan fly-by targeting burns needed for gravity assist. This reduction in critical sequence length translates directly into a reduced probability of catastrophic failure.

The observing efficiency of high-precision airborne and orbiting astronomy telescopes can be improved markedly by automating celestial target acquisition using AST 10 co-boresighted with the telescope. After a slew to a new target, AST 10, operating in update mode, identifies the stars 2 in its field of view 20, determines its attitude, and provides this information to the pointing control system of the telescope. The telescope pointing error is then reduced to a level where the Fine Guidance Sensor (FGS) can acquire the guide star(s) used for pointing control.

Relative to an automated acquisition scheme that uses the Fine Guidance Sensor exclusively, the addition of AST 10 eliminates the need for ground selection and on-board storage of a significant number of guide stars around each target (in addition to the one(s) needed for pointing control).

SIRTF (Space InfraRed Telescope Facility), SOFIA, and the Kuiper Airborne Observatory (KAO) are examples of programs that would benefit from the presence of AST 10. Implementation of automated target acquisition would increase the Kuiper Airborne Observatory observing time by some 15 percent. The observation time for sounding rocket payloads could be increased by at least 25 percent when using AST 10.

When used to update the attitude of gyro-based attitude control systems, AST 10 eliminates ground selection and on-board storage of guide stars for each update. By operating in the update mode, AST 10 provides its attitude every time a request is received from the attitude control system of spacecraft 1. Since there is no penalty for performing frequent updates, AST 10 can be used either to improve accuracy or to reduce cost, by allowing the use of cheaper, less accurate gyros.

AST 10 is also ideally suited for updating the attitude of strapdown inertial navigation systems on ballistic missiles.

Due to the absence of an inertial platform, these systems need more frequent attitude updates to maintain navigational accuracy. In addition to being able to perform updates at the desired higher frequency, the all-sky capability of AST 10 eliminates the need to reorient the vehicle for updates.

AST 10 can provide its attitude at rates high enough (e.g., up to 20 Hz) to eliminate the need for gyros on spacecraft 1 in certain cases, thus improving reliability while reducing weight, power, and cost.

Optical navigation is employed by planetary spacecraft 1 to determine the spacecraft's location relative to nearby bodies such as planets, satellites, comets, and asteroids. It involves establishing the inertial direction and rotation rate of the vector from the spacecraft 1 to the solar body of interest using multiple images of that body against the stellar background. Being performed on the ground, optical navigation is currently hampered by long delay times, making it unacceptable for future missions like Rosetta, a joint NASA/ ESA effort for returning a comet nucleus sample.

Combined with a Global Positioning System (GPS) receiver, AST 10, operating in its tracking mode, will enable autonomous, high-precision pointing from space to terrestrial targets as required for secure laser communication and efficient, quick-response surveillance. The space qualified miniature AST 10 described herein will make it possible to point to targets with better than 10 m accuracy from an altitude of 500 km.

A zenith-pointing AST 10 can be used for autonomous position determination of planetary rovers. In this case, AST 10 is used to determine the inertial direction for the local vertical. Given the time of the starfield 3 observation and the direction of the local vertical, the position of a vehicle on Mars can be computed to an accuracy of a few hundred meters.

The acquisition mode of AST 10 is used for initialization or after a power outage. It takes about a second. It is particularly good for interplanetary missions, because it facilitates antenna pointing without the need for ground commands. In acquisition mode, usually just the acquisition guide star database 8 is used. In the embodiment described herein, the acquisition guide star database 8 contains 4,400 stars. Software or firmware modules 5, 6 within computer 15 are used to match observed stars 2 within starfield 3 with stars from the acquisition guide star database 8. If a preselected number of stars match, the acquisition of the attitude is deemed to be successful. Typically, this preselected number of stars is four. If four stars are not matched, then the match group(s) with three stars are examined, in conjunction with the supplementary guide star database 9, to see if at least one match group having at least four stars can be constructed.

Tracking mode, as opposed to acquisition mode, is used for normal operation (after acquisition has been accomplished). In tracking mode, both the acquisition guide star database 8 and the supplementary guide star database 9 are used.

A preferred manner of using matching modules 5, 6 and attitude determination module 7 in the tracking mode will now be described. First, acquisition is performed, as described above. As stated above, this results in the formation of a star match group having at least four stars, i.e., at least four stars 2 are identified. Then, module 7 is invoked to perform a first computation of the attitude of AST 10. In the same frame, additional stars (as many as there are for that field of view 20, e.g., up to 50) are taken from guide star database 18. Module 6 predicts the location of these additional stars within field of view 20, and checks to see which of these stars match observed stars 2. Then, still in the same frame, attitude determination module 7 is invoked to recompute the attitude of AST 10, this time using the identified additional stars as well as the original stars, thereby improving the attitude accuracy. Now, module 6 assumes a worst case angular rate of AST 10 (one degree per second in the preferred embodiment) and also assumes a worst case amount of time necessary to perform star identification and attitude determination (one second in the preferred embodiment). Next, module 6 predicts which stars from frame 1 (time t=1) will be present in frame 2 (corresponding to time t=2). Module 6 picks the 8 or so "best" (e.g., brightest) such stars and calls them "propagation guide stars".

Now, we are in the second frame (time t=2). Star identification module 6 determines which stars in that frame correspond to the propagation guide stars selected in the previous frame. Thus, in the embodiment described herein, up to 8 stars are so identified. Then, attitude determination module 7 is invoked to compute the attitude of AST 10 based upon these propagation guide stars that are common to both frames. Next, as before, additional guide stars are taken from guide star database 18 and have their locations predicted within field of view 20. And it is checked to see which of these stars match observed stars 2. Then, as before, attitude determination module 7 is invoked to refine the attitude of AST 10 (still in the second frame). Now, rather than assuming the worst case angular rate of AST 10, and the worst case amount of time necessary to perform star identification and attitude determination, module 7 uses the most recently calculated rate (based upon the differences between the calculated attitudes for the two most recent frames and the known time lapse therebetween) to predict which stars from frame 2 will be present in frame 3, i.e., a new set of propagation guide stars is selected.

The process described in the preceding paragraph is repeated for all subsequent frames as long as we remain in the tracking mode. The main advantage of this method (compared with, for example, the method used in acquisition mode) is that it is much faster to compare the 50 or so observed stars 2 with just the 8 or so propagation guide stars, rather than with a substantial portion of the entire population of 4,400 or so stars from acquisition guide star database 8.

FIG. 2 shows that the field of view 20 encompassed by CCD 13 is typically broken into a number of pixels, typically 1024×1024 pixels. In a preferred (window tracking) embodiment of the present invention, a grid of superpixels 21 is superimposed upon the grid of pixels. Each superpixel 21 is bigger than each pixel. Typically, a superpixel 21 covers 16×16 pixels. In this embodiment, there are 64×64 superpixels 21. An intensity threshold is assigned to each superpixel 21. In the preferred embodiment, the calculation of the thresholds is done by software and the actual threshold setting is done by camera electronics 14. Within each superpixel 21, only those pixels having recorded intensities over the threshold are digitized for subsequent processing. This threshold setting can be done by hardware within camera electronics 14. The thresholds can vary from superpixel 21 to superpixel 21, and are set relative to the sensed background. It may be desirable to vary the threshold in this manner when, for example, the field of view 20 is taken near the sun, and the sun thereby causes a varying background intensity across CCD 13.

Another advantage of using superpixels 21 is that, for the subsequent time frame when the attitude determination method 7 is performed, just certain superpixels 21(2) are chosen for processing: those superpixels 21(2) where the observed stars 2 from the first time frame (corresponding to superpixel 21(1) on FIG. 2) are expected to be. This expectation is based upon where the stars 2 were at the first frame, and the known (from AST 10) motion of the spacecraft 1 in inertial space. This method saves processing time, because most of the superpixels 21 do not need to be processed (even though, on average, approximately two superpixels 21(2) per star 2 are used). After these new superpixels 21(2) are selected for processing, thresholding is again used to eliminate those pixels within each processed superpixel 21 where the observed intensity does not exceed the preselected threshold. The thresholds can be lowered to improve accuracy.

In the preferred embodiment, two tracking modes are used: thresholded tracking is used when the motion of AST 10 is greater than 0.3 degree per second, and windowed tracking (using superpixels 21 as described above) is used when the motion of AST 10 is less than 0.3 degree per second.

After CCD 13 measures the intensities of observed stars 2 within starfield 3, the size of each star 2 can be scaled by star position and brightness module 5 to cover a set of pixels of a certain size, e.g., 3×3 or 5×5. The center of the set of pixels corresponds to the brightest pixel due to the star 2. Smears and low intensity light images are filtered out. Then the center of each observed star 2 is determined by module 5. This is done, in a preferred embodiment, by using a first moment method based upon the observed intensity pattern of said star 2. First, intensities beneath a preselected threshold are discarded. Then the first moment method is used to calculate the position of the star 2. This results in position resolution much better than pixel-by-pixel.

The method 6, 7 for determining the attitude of spacecraft 1 typically involves five steps, defined here and elaborated upon later:

1. A set of match groups is generated by matching pairs of stars 2 observed by CCD 13 with pairs of guide stars from database 18.
2. Match groups having small numbers of stars are eliminated.
3. Non-eliminated match groups are validated.
4. Redundant match groups are eliminated.
5. A match group having the largest number of stars is selected. The attitude of the spacecraft 1 is derived 7 from the inertial and observed positions of guide stars within this match group.

These steps will now be described in more detail.

Step One. The brightest observed stars 2, typically from 8 up to 12 in number, are normally used. In step one, it is determined which pairs of guide stars match each pair of observed stars 2, a process that results in the formation of match groups. The matching is performed by matching intensity and angular separation within a certain tolerance. The separation tolerance (TSEP) (see FIG. 7) is typically about four times the standard deviation of the position uncertainty of each star. By angular separation is meant the angle (shown as angle A on FIG. 1) formed by two straight lines: a line connecting CCD 13 and the first star 2(2), and a line connecting CCD 13 and the second star 2(3).

FIG. 3 shows an exemplary match group having four stars (actually, pairs of stars, one observed star and one guide star—the abbreviation "star" is used because ultimately the pair is expected to resolve into a single guide star). It consists of a kernel star and three member stars. This match group was created because, first, it was found that the pair consisting of guide stars 14 and 26 matched the pair of observed stars 1 and 2. Then the pair consisting of guide stars 14 and 51 was found to match the pair made up of observed stars 1 and 4. Finally, it was found that the pair consisting of guide stars 14 and 3 matched the pair comprising observed stars 1 and 7. By definition, a match group has one kernel star; and a kernel star is a star that is common to two or more matches of star pairs.

The pairs of selected observed stars 2 are generated in such a way that the first pair of observed stars ($OP_1$) contains the brightest and next brightest of the selected observed stars 2, the second pair ($OP_2$) contains the brightest and third brightest stars, the third pair ($OP_3$) contains the second brightest and third brightest stars, and the last pair ($OP_{n \times n/2-n/2}$) consists of the two faintest selected observed stars 2. The ranking is shown in the matrix of FIG. 6, which shows the observed stars 2 used for pairing on the horizontal and vertical axes as $O_1, O_2, \ldots, O_n$; and the pairs as the matrix elements $OP_1, OP_2, OP_3, \ldots OP_{n \times n/2-n/2}$. The observed stars 2 shown along the axes are sorted in sequence of decreasing brightness with $O_1$ being the brightest star and $O_n$ being the faintest star.

When generating the match groups, observed star pair $OP_1$ is first matched with the pairs of guide stars (that have been presorted by increasing angular separation), followed by pair $OP_2$, and so on, with pair $OP_{n \times n/2-n/2}$ being the last pair processed in step one. This processing sequence yields the highest star identification success rate in the presence of the match group size constraint, because match group members that cannot be added in case a match group has reached its maximum size are made up of faint observed stars 2, which have a lower probability of actually being guide stars.

Rapid matching of guide star pair candidates with each pair of observed stars 2, which is important for fast star identification, is achieved by three techniques in the present invention: a) Having the guide star pairs sorted in sequence of increasing angular separation (SEP). b) Exploiting the fact that the sequence number of a guide star pair (NPV) is, by first approximation, a quadratic function of the angular separation (SEP) of the pair. This relationship is depicted graphically in FIG. 7. c) Using a discrete correction function to account for the fact that the aforementioned relationship is not exactly a quadratic function.

Using features a, b, and c, an estimate of the guide star pair identification number (NPV) that matches an observed star pair is obtained by assuming the quadratic relationship, which yields NPV1; then by applying the discrete correction term DNPV, where NPV=NPV1+DNPV. This process involves the following five steps:

1) Compute the ratio (RDISSQ) of the square (DISSQ) of the angular separation (DIS) of the observed star pair and the square (SEPLSQ) of the largest angular separation (SEPL) among the guide star pairs:

RDISSQ=DISSQ/SEPLSQ

This is approximately a straight line function. DIS is the same as angle A on FIG. 1.

2) Compute NPV1, assuming the quadratic relationship and using the total number of guide star pairs (RNGSTP):

NPV1=INT(RDISSQ*RNGSTP)

where INT stands for taking the integer value of the real result of the multiplication.

3) Compute the index of the discrete correction term:

$$IBIN=INT(RDISSQ*RNBIN)+1$$

where IBIN is the number of the bin, RNBIN is the number of bins into which the guide star pairs have been divided, and IBIN is set equal to RNBIN if the result of the above computation exceeds RNBIN. Typically, there are about 400 bins, each with approximately 300 guide star pairs (a result of the above-mentioned quadratic relationship). Each bin has the same number of guide star pairs. The number of bins should be chosen such that there is a high probability that guide star pair NPV matches the angular separation of the observed star pair (DIS).

4) Read the discrete correction that applies to the specific bin:

$$DNPV=NDELMV(IBIN)$$

meaning that delta-NPV (DNPV) is a function of IBIN. The vector (function) NDELMV is generated as part of the guide star pair generation on the ground and is loaded into the memory of AST 10 as part of the guide star pair database 18.

5) Estimate the identification of the guide star pair that matches the angular separation of the observed star pair:

$$NPV=NPV1+DNPV$$

A discrete selection function was selected because it is adequate and involves the least amount of computation, therefore minimizing the time required for star identification.

The present invention preferably uses a matrix called IDGRP(O,G) to assist in the rapid formation of match groups. The elements of this matrix are initialized to 0. The matrix indicates the sequence number of the match group which has observed star O and guide star G as its kernel. Every time an observed star pair $O_i, O_j$ is found to match a guide star pair $G_k, G_l$, it is first checked to see whether IDGRP($O_i, G_k$) is 0. If IDGRP($O_i, G_k$) is 0, a new match group is generated with $O_i$ and $G_k$ as the kernel and $O_j, G_l$ as its first member. The value of IDGRP ($O_i, G_k$) is changed from 0 to the number of match groups previously generated plus 1. However, if IDGRP($O_i, G_k$) is not equal to 0, it implies that a match group with $O_i, G_k$ as its kernel has already been generated, i.e., match group IDGRP($O_i, G_k$). In that case, the match group IDGRP ($O_i, G_k$) is expanded with a new member $O_j, G_l$. Having processed the match of $O_i, G_k$, the process is repeated for the match of $O_j, G_l$.

Step Two. In this step, match groups having a small number of stars are eliminated, as they are likely to be spurious. Typically, about the smallest 90 percent of the match groups are discarded in this step.

In order to set a threshold for the match group size, the upper bound for the size of valid match groups needs to be estimated first. A necessary condition for the presence of a valid match group with i stars (one kernel plus i-1 members) is that there are at least i-1 match groups with i-1 or more members.

In the example of FIG. 3, where i=4, we have clean match groups where the number of match group members plus 1 is equal to the number of guide stars and equal to the number of observed stars 2 involved in the group. However, due to chance matches, this is not always the case. For example, the guide star pair 14,26 could, in addition to matching observed pair 1,2, also match observed star pair 1, 8, resulting in an uncorrected match group size of 5. Or, observed pair 1,2 could, in addition to matching guide star pair 14,26, also match guide star pair 14,47. Thus, it is insufficient to use only the number of members in a match group for estimating the size of the valid match group. Therefore, the present invention preferably estimates the valid match group size as being the smallest of the following three quantities: (1) the number of match group members plus 1, (2) the number of independent guide stars in the match group, and (3) the number of independent observed stars in the match group. This technique is important in maximizing the success probability of star identification, because it avoids giving preferential treatment to match groups that have a large uncorrected size due to chance matches. Because of such preferential treatment, the threshold for the size of match groups that are eliminated could be set too high, resulting in failed identification due to the elimination of the crucial correct match groups.

The problem of erroneous elimination of crucial match groups can also be avoided by performing the validation step (step three) prior to the step of eliminating small match groups (step two). In other words, steps two and three can be reversed in time sequence. However, this technique adversely affects the speed of star identification.

Step Three. In this step, the validation of the remaining match groups is performed. What is checked is whether the angular separations (dashed lines in FIG. 4) between the member stars match their expected values for the corresponding guide stars. The three angular separations indicated by dashed lines on FIG. 4 are checked using original data from step one. In step one, an additional three match groups with the same stars as the original match group had been generated. The first additional match group has observed star 2 and guide star 26 as its kernel. The kernel of the second additional match group consists of observed star 4 and guide star 51. Observed star 7 and guide star 3 form the kernel of the third additional match group. Validation entails checking whether the angular separations between the members of the original match group (dashed lines in FIG. 4) correspond to kernel-to-member separations in a subset of the additional match groups. In the example, we will find that one kernel-to-member separation in the first additional match group corresponds to the member #1 to member #2 separation of the original match group, thus validating this separation, while, in addition, we will find that another kernel-to-member separation in the first additional match group corresponds to the member #1 to member #3 separation of the original match group. Also, we will find that one of the kernel-to-member separations in the second additional match group corresponds to the member #2 to member #3 separation of the original match group, thus completing the validation process. However, there are three redundant match groups (the three additional match groups). This redundancy is eliminated in step four. If the angular separations do not check, validation has not occurred, and one of the stars is arbitrarily eliminated from the match group; alternatively, the faintest star is discarded. In either case, such a match group now has one fewer star.

Step Four. The above described redundancy from step three is eliminated in step four. For match groups that have been validated, it doesn't matter which match group one takes (the original match group or one of the additional match groups), because these match groups contain the same stars.

Step Five. It is assumed that the largest remaining match group (the one with the largest number of stars) represents a correct match of the observed stars 2 and guide stars involved. There is usually just a single match group having the greatest number of stars. However, if there are a number of equally sized large match groups, the group with the highest match "quality" is selected as the correct one. Quality can be measured in terms of the closeness of the fit between the observed stars and the guide stars. Fit can be defined in terms of angular separation, brightness, or both.

After modules 5 and 6 have been invoked as described above, module 7 is invoked to determine the attitude of AST 10 in inertial space from the inertial positions of the guide stars in the winning match group, plus the positions of these guide stars within field of view 20. The attitude of AST 10 (and spacecraft 1) can be defined in terms of three Euler angles (e.g., right ascension, co-declination, and twist); quarternions; or a direction cosine matrix. Any conventional method can be used to make this attitude determination. For example, a least squares fit method can be used. When performing the least square fit, the effective focal length of the system as well as parameters describing image distortion can be determined, in addition to the three Euler angles. The latter self-calibration feature further improves the attitude accuracy.

Option to Reduce the Number of Guide Star Pairs

Since, for a given guide star density, expressed as the average number of guide stars per field of view 20, the number of guide star pairs increases with the square of the largest separation angle (SEPL) for the guide star pairs in database 18, it follows that a large reduction of ROM 19 can be realized if SEPL is reduced. For example, a reduction of SEPL to 70% of its original value reduces the number of guide star pairs to 0.7×0.7=0.49, or 49% of its original value.

In order to benefit from this reduction while minimizing the impact on the star identification success rate, it is necessary to modify the star identification process as follows. Step one is not modified. Step two is modified in that, while small match groups are eliminated, threshold-exceeding match groups (i.e., match groups that exceed the numerical quality threshold) are not reduced in size if one or more of their members happen to be kernels of previously eliminated small match groups. Next, in validation step three, the method of angular distance validation (broken lines in FIG. 4) depends upon whether or not the angle exceeds SEPL. If it does not exceed SEPL, the validation method is unchanged. However, if it does exceed SEPL, the separation angle of the pair of guide stars is computed ab initio every time a validation is required. Steps four and five remain unchanged.

The price paid for the reduction of ROM 19 permitted by this option is an increase in star identification time and a small (depending on the SEPL value) reduction in the star identification success probability.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A method for determining the attitude of a spacecraft by observing stars, the method comprising the steps of:

at a first time, observing a set of stars within a preselected field of view by a camera on board the spacecraft to obtain a first set of observations;

matching said first set of observations against original guide stars within a guide star database stored on board the spacecraft;

deriving a first approximation of the attitude of the spacecraft from positions of original guide stars that matched with observed stars from the first set of observations;

selecting a first set of additional stars from the guide star database and predicting the location of said first set of additional guide stars within the field of view;

deriving an improved approximation of the attitude of the spacecraft from positions of the original guide stars and the first set of additional guide stars;

using an angular rate of the spacecraft and a needed time for star identification and attitude determination to predict which stars from the first time, called propagation guide stars, will be present in the field of view of the camera at a subsequent time;

selecting several of said propagation guide stars;

at said subsequent time, determining which stars in the field of view correspond to the selected propagation guide stars;

deriving a first approximation of the attitude of the spacecraft from positions of the propagation guide stars so determined in the previous step;

selecting a second set of additional guide stars from the guide star database and predicting the location of said second set of additional guide stars within the field of view;

deriving an improved approximation of the attitude of the spacecraft from positions of the determined propagation guide stars and the second set of additional guide stars; and selecting a second set of propagation guide stars from among stars that are expected to be within the field of view at yet another future time.

2. The method of claim 1 wherein the angular rate of the spacecraft has been calculated during the step of deriving an improved approximation of the attitude of the spacecraft.

3. A method for determining the attitude of a spacecraft by observing stars, the method comprising the steps of:

commanding a camera that is on board the spacecraft to observe a set of stars within a preselected field of view that has been divided into pixels;

superimposing a grid of superpixels upon the field of view, wherein each superpixel is larger than each pixel;

setting an intensity threshold for each superpixel, wherein the intensity threshold can vary from superpixel to superpixel; and discarding an intensity of a star that is below the intensity threshold associated with a superpixel where said star is located.

4. The method of claim 3 wherein the steps of claim 3 are performed at a subsequent moment in time, at which observed star intensities are processed only for those superpixels where said observed stars are expected to be located at said subsequent moment in time.

5. The method of claim 4 wherein, for those superpixels where observed star intensities are processed at said subsequent moment in time, observed star intensities that fall below the thresholds associated with pixels within said superpixels are discarded.

6. A method for determining the attitude of a spacecraft by observing stars, the method comprising the steps of:

using a camera that is located on board the spacecraft to generate a set of match groups by matching pairs of stars observed by the camera with pairs of guide stars from a stored database of guide stars;

eliminating match groups having small numbers of stars;

validating non-eliminated match groups;

eliminating redundant match groups;

selecting a match group having the largest number of stars; and deriving the attitude of the spacecraft from positions of guide stars within said selected match group;

wherein smallness in terms of eliminating match groups having small numbers of stars is defined in terms of:

the number of members in the match group plus one;

the number of independent guide stars in the match group; and the number of independent observed stars in the match group.

7. A method for determining the attitude of a spacecraft by observing stars, the method comprising the steps of:

using a camera that is located on board the spacecraft to generate a set of match groups by matching pairs of stars observed by the camera with pairs of guide stars from a stored database of guide stars;

eliminating match groups having small numbers of stars;

validating non-eliminated match groups;

eliminating redundant match groups;

selecting a match group having the largest number of stars; and deriving the attitude of the spacecraft from positions of guide stars within said selected match group;

wherein an identification matrix is used to speed the star identification process, said identification matrix being a matrix having an entry (O,G) that indicates a sequence number of a match group having observed star O and guide star G as a kernel of the match group.

8. A method for determining the attitude of a spacecraft by observing stars, the method comprising the steps of:

using a camera that is located on board the spacecraft to generate a set of match groups by matching pairs of stars observed by the camera with pairs of guide stars from a stored database of guide stars;

eliminating match groups having small numbers of stars;

validating non-eliminated match groups;

eliminating redundant match groups;

selecting a match group having the largest number of stars; and deriving the attitude of the spacecraft from positions of guide stars within said selected match group;

wherein the guide star pairs are presorted in order of increasing angular separation;

an estimate of a match is made by assuming, as a first approximation, that a sequence number of a guide star pair is a quadratic function of the angular separation of the guide star pair; and a discrete correction function is applied to said estimate to account for the fact that the sequence number of a guide star pair is not exactly a quadratic function of the angular separation of the guide star pair.

9. A method for determining the attitude of a spacecraft by observing stars, the method comprising the steps of:

using a camera that is located on board the spacecraft to generate a set of match groups by matching pairs of stars observed by the camera with pairs of guide stars from a stored database of guide stars;

eliminating match groups having small numbers of stars;

validating non-eliminated match groups;

eliminating redundant match groups;

selecting a match group having the largest number of stars; and deriving the attitude of the spacecraft from positions of guide stars within said selected match group;

wherein the match groups are formed by first ranking observed star pairs in order of brightness, and then by matching pairs of observed stars against pairs of guide stars in order of brightness.

* * * * *